W. McGREGOR.

CONVERTIBLE CHAIR

No. 7,194. Reissued June 27, 1876.

Witnesses

Chas. H. Smith

Harold Sewell

Inventor

William McGregor.

per Lemuel W. Serrell atty

N. PETERS, PHOTO-LITHOGRAPHER, WASHINGTON, D. C.

UNITED STATES PATENT OFFICE.

WILLIAM McGREGOR, OF CHICAGO, ILLINOIS.

IMPROVEMENT IN CONVERTIBLE CHAIRS.

Specification forming part of Letters Patent No. 103,066, May 17, 1870; reissue No. 7,194, dated June 27, 1876; application filed April 12, 1876.

*To all whom it may concern:*

Figure 1:
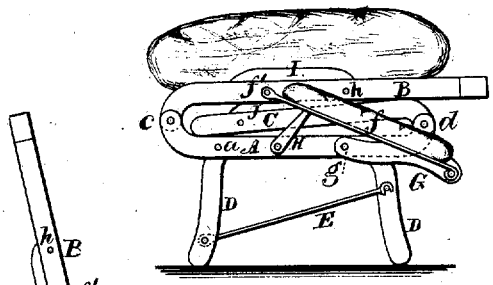
Figure 2:
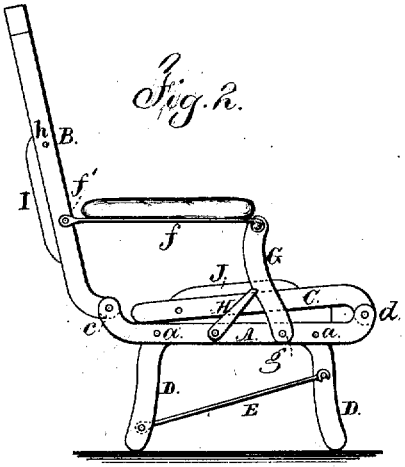
Figure 3:
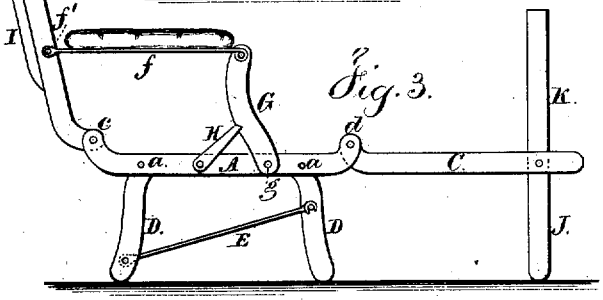
Figure 4:
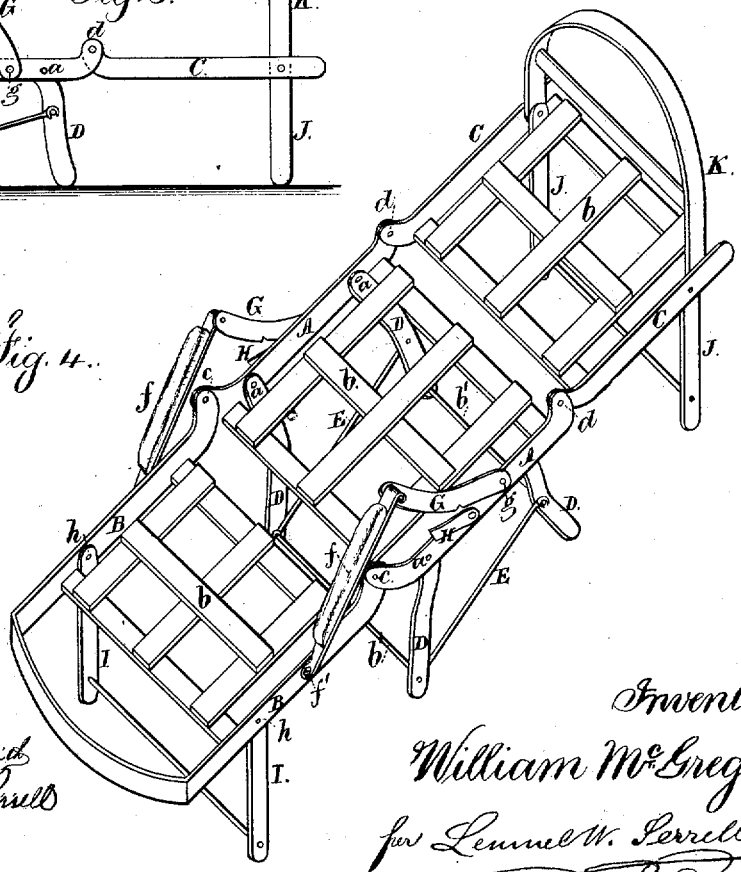

Be it known that I, WILLIAM McGREGOR, of Chicago, in the county of Cook and State of Illinois, have invented an Improvement in Convertible Folding Chairs, of which the following is a specification:

This convertible folding chair is made of metal, and can be folded for transportation, or used as an ottoman or stool, as shown in Figure 1, or opened for use as a chair, as seen in Fig. 2, or extended in the form of a crib for a child, as shown in Fig. 3, or spread to form a bedstead, as in the perspective view, Fig. 4.

The seat-frame is made of the side pieces A, between which are cross pieces or slats *b*, upon which the seat or cushion rests, and the legs D D are hinged to this seat-frame A at *a*.

The legs are connected by cross-bars *b'*, and there are side bars E, hinged at one end, and provided with hooks at the other end to connect the legs, but allow them to be folded for transportation.

The back-frame B is united to the seat-frame A, by the pivots *c*, and the extension or foot-rest frame C is pivoted to the seat-frame A at *d*.

The side bars A are bent upwardly at their ends, as represented, so that the pivots or hinges for the bars B and C come above the top line of such bars A, in order that the frame C may be folded over upon the seat-frame A, and the back-frame B be folded down over the seat-frame. This allows the chair to be used as an ottoman or stool, as in Fig. 1, or to be packed into a small space for transportation.

There are arms to the chairs formed by the bars *f* and *g*, pivoted together and connected to the back at *f'* and to the seat-frame at *g*, respectively, and in order to support the arms and the back at a greater or less inclination. There are pawls H between the seat-frame and the arm-piece G. The pawls can be moved to allow the back-frame to assume a horizontal or nearly horizontal position, as in Fig. 4. In this case the chair is adapted to use as a bed, and the legs I that are pivoted in the back B at *h* are turned down to support this portion of the bedstead.

The frame C swings upon the pivots *d*, and when turned over upon the seat-frame A it forms the seat or support for the seat or cushion, as in Fig. 2. It may be unfolded to the position shown in Fig. 3 to form a part of the bottom of a crib, or it may be placed at an inclination to the frame A to form a rest for the legs when used as an invalid's reclining-chair.

The legs J are pivoted to the frame C, and serve as a support to the same when turned over to form a crib, as in Fig. 3, and the frame K forms a support for a pillow. This frame K is pivoted to the frame C, and can be turned down upon it, but a stop limits its motion when turned up, as in Fig. 3.

This chair is very convenient, as it can be folded into a very small compass, and it can be opened out, more or less, according to the use to which it is put, and I remark that movable cushions or other upholstery work is to be employed in the chair or upon the arms to adapt the same to use as a chair or lounge. The drawing, however, represents the metallic portions or frame.

I claim as my invention—

1. The metallic chair-frame, made with the ends of the bars A of the seat-frame turned upward, and receiving the pivots of the folding frame C, substantially as and for the purposes set forth.

2. The metallic chair-frame, made with the ends of the bars A of the seat-frame turned upward, and receiving the pivots of the folding frame B of the back of the chair, substantially as set forth.

3. The combination, with the metallic seat-frame A, and hinged back-frame B, of the arm-pieces *f* and G, hinged together, and also hinged at their respective ends directly to the seat-frame and back, and the pawls H, between the seat-frame and the arm-piece *f*, for the purposes and as set forth.

4. The seat-frame A and frame C, hinged together, in combination with the folding frame K, substantially as set forth.

Signed by me this 13th day of March, A. D. 1876.

WILLIAM McGREGOR.

Witnesses:

D. L. COLUMBIA,

CHAS. S. THORNTON.